United States Patent [19]
Heinicke

[11] 3,921,054
[45] Nov. 18, 1975

[54] APPARATUS FOR CONVERTING D.C. VOLTAGE

[75] Inventor: Harald Heinicke, Erlangen, Germany

[73] Assignee: Siemens Aktiengesellschaft, Munich, Germany

[22] Filed: Sept. 12, 1974

[21] Appl. No.: 505,261

[30] Foreign Application Priority Data
Sept. 27, 1973 Germany............................ 2348622

[52] U.S. Cl. .......................... 321/2; 321/11; 323/6; 323/17; 323/48; 323/8
[51] Int. Cl.² ........................................ H02P 13/20
[58] Field of Search .......... 321/2, 11; 323/6, 17, 48, 323/60, 61, 83, 78, 88, 8; 307/297

[56] References Cited
UNITED STATES PATENTS

| | | | |
|---|---|---|---|
| 2,082,121 | 6/1937 | Rypinski | 323/83 X |
| 3,119,060 | 1/1964 | Spector | 323/61 |
| 3,322,968 | 5/1967 | Dennis | 323/48 X |
| 3,381,165 | 4/1968 | Taylor | 321/2 X |
| 3,665,292 | 5/1972 | Flynn | 323/48 |
| 3,851,239 | 11/1974 | Suzuki | 321/2 X |

OTHER PUBLICATIONS

"Current Regulating CKT Using Core Transformer," by Branin et al.; *IBM Tech. Disc. Bull.*, Vol. 16, No. 7, Dec. 1973, pp. 2172, 2173.

*Primary Examiner*—Gerald Goldberg
*Attorney, Agent, or Firm*—Kenyon & Kenyon Reilly Carr & Chapin

[57] ABSTRACT

The invention concerns a D.C. voltage converter with a transformer which has a magnetization reversing coil connected in series with a limiting resistor across the D.C. voltage source. The invention consists of connecting a choke inductor in series with the magnetization reversing coil and the limiting resistor where the choke inductor has an inductance value such that the magnetization reversing current is at all times greater than the value V/R, where V signifies the voltage of the D.C. voltage source and R signifies the ohmic resistance value of the limiting resistor. This arrangement yields a reduction of the physical size of the transformer.

2 Claims, 4 Drawing Figures

APPARATUS FOR CONVERTING D.C. VOLTAGE

BACKGROUND OF THE INVENTION

1. Field of the Invention

This invention relates to apparatus for use in a D.C. voltage converter containing a transformer.

2. Description of the Prior Art

D.C. voltage converters have been used in the prior art which have a transformer consisting of a primary coil in series with a switch across a D.C. voltage source, a secondary coil connected to a rectifier the output of which is applied to a load, and a magnetization reversing coil which is connected to a limiting resistor so that the magnetization reversing current flowing through the magnetization reversing coil magnetizes the magnetic core of the transformer in the opposite direction to the primary current in the primary coil.

Such D.C. voltage converters are used to convert a fixed D.C. voltage into an output D.C. voltage of variable level.

The switch connected to the primary coil is often controlled to yield varying frequencies of oscilation. In particular a thyristor is often used to perform the switching function.

The resistance of the limiting resistor connected in series with the magnetization reversing coil must be relatively high, in order to limit the magnetization reversing current to permissible levels during the time in which the switch is closed. During the time in which the switch is open the magnetization reversing current then drops to lower levels which is undesirable considering the design of the transformer.

It is an object of this invention to retain the limitation of the magnetization reversing current but to increase its level during the time the switch is open in order to achieve a reduction of the physical size of the transformer.

SUMMARY OF THE INVENTION

The objective is achieved in accordance with this invention by connecting a choke inductor in series with the magnetization reversing coil and the limiting resistor. The choke inductor has a design inductance so that when the switch is cycling on and off the magnetization reversing current remains at all times above the value V/R where V signifies the supply voltage of the D.C. voltage source and R denotes the resistance value of the limiting resistor.

DESCRIPTION OF THE INVENTION

Figure 1:
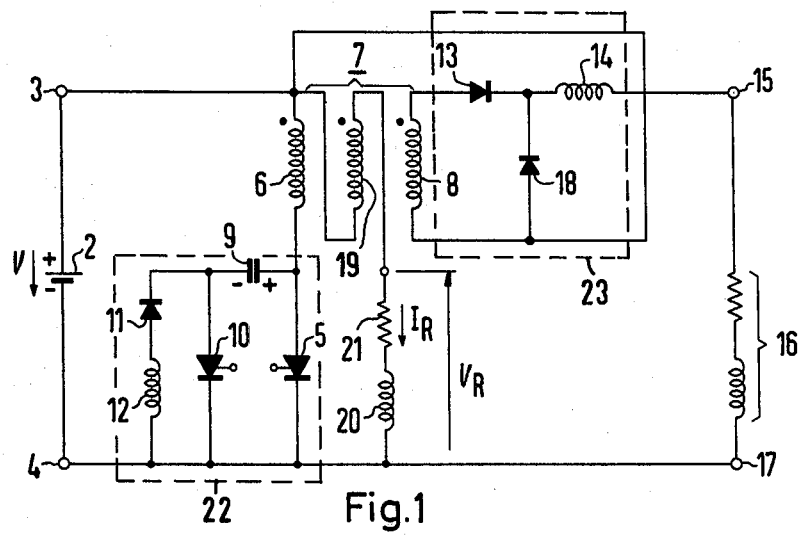
FIG. 1 shows a D.C. voltage converter with a voltage transformer having a choke inductor in series with the magnetization reversing coil.

FIG. 1 shows a D.C. voltage transformer used in a D.C. converter for converting a constant voltage power supply. A D.C. voltage source 2 of the supply voltage of value V is connected with its terminals 3 and 4 to a series circuit consisting of a switching circuit 22 and a primary coil 6 of a transformer 7. The secondary coil 8 is connected to the positive terminal 3 of the voltage source and to a rectifier circuit 23.

Within the switching apparatus within dashed-lines 22 is shown a particular means for switching the current through the primary coil 6. Primary switching is accomplished by means of a thyristor 5. The switching circuit additionally encompasses a quenching device and a reversal device. The quenching device is connected in parallel with the thyristor 5. With its help the thyristor can be extinguished following ignition. It is composed of the series circuit of a quenching capacitor 9 with a controlled quenching thyristor 10 which is connected as shown in FIG. 1 between the anode and cathode of thyristor 5. To perform as a reversal device a diode 11 in series with a reversal choke 12 is connected across the quenching thyristor 10. The thyristor 5 can be alternately opened and then closed during variable time intervals by controlling quenching and reversing times.

The rectifying circuit as shown within dashed-lines 23 connected to one end of the secondary coil 8 of transformer 7, is embodied by a diode 13 in series with the choke inductor 14 to the output terminal 15. The other end of the second coil 8 is connected to the positive terminal 3 of the D.C. voltage source. A diode 18 is connected with its cathode to the junction of the diode 13 and the choke inductor 14 on one side and with its anode connected to the positive terminal 3 of the D.C. voltage source 2. Diode 13 and diode 18 functioning with secondary coil 8 act as a half-wave rectifier. Output terminals 15 and 17 can be connected with a load 16 shown having a resistive and inductive component.

Furthermore, the transformer 7 has a magnetization reversing coil 19. This is connected in series with a choke inductor 20 and a limiting resistor 21 across the terminals 3, 4 of the D.C. voltage source 2. The connection is made so that the magnetization reversing current $I_R$ is driven by the D.C. voltage source 2 in an opposite direction to the primary current flowing through primary coil 6.

Figure 2:
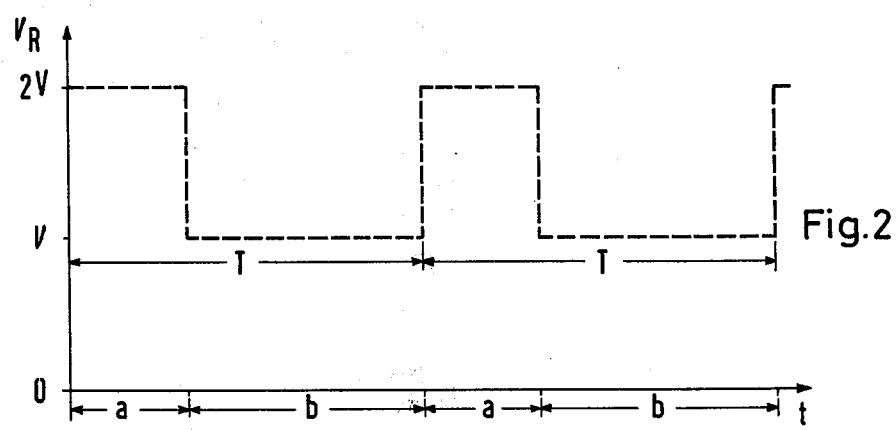
FIG. 2 shows a voltage-time diagram for a typical operation of the D.C. converter.

FIG. 2 shows in dashed lines the characteristics of the voltage $V_R$ across the limiting resistor 21 as a function of time without the effect of the choke inductor 20 and the inductance of the magnetization reversing coil 19. It is apparent that the voltage $V_R$ assumes different values when the switch within dashed lines 22 is closed or opened. In particular, when the switch 22 is closed during the time intervals $a$, the voltage $V_R$ is twice the level during the variable time intervals $b$ when the switch is open. When the switch is open $V_R$ corresponds to the level of supply voltage 2. The cycle period T is equal to the sum of the open and close periods, and of course the frequency of operation is equal to 1/T.

Figure 3:
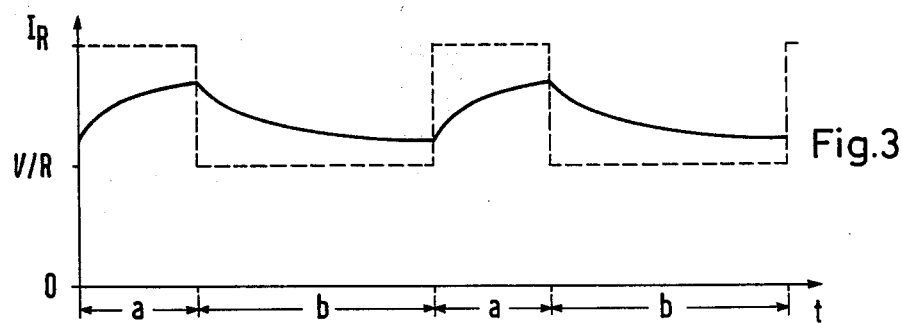
FIG. 3 shows a current-time diagram for a typical operation of the D.C. converter.

FIG. 3 shows the waveform of the magnetization reversing current $I_R$ as a function of time. The dashed-line rectangular curve corresponds to the case where the choke inductor 20 is again absent, and the solid-line waveform demonstrates the manner in which the magnetization reversing current $I_R$ is smoothed when the choke inductor 20 is in series with the limiting resistor 21. It can be seen from FIG. 3 that during the time intervals $b$ the magnetization reversing current $I_R$ without the choke inductor (dashed-lines) assumes the constant level V/R. By comparison it is apparent that with the insertion of the choke inductor 20 the magnetization reversing current $I_R$ (solid line) is increased. The inductance of the choke inductor 20 determines the rise and decay time constant for the current $I_R$ (solid line) of FIG. 3. This time constant is high enough so that the magnetization reversing current $I_R$ remains at all times above the level V/R. This is true of course only where the voltage source 2 is being separately switched. Where a small duty cycle ($a/a+b$), e.g., 0.2, is used, the time constant requirement can be met by using a choke inductor of relatively small inductance and hence with a relatively small cost.

With increasing modulation by the switching element 22, i.e., with increased duty cycle ($a/a+b$), the magnetization reversing current $I_R$ will increase. This can be recognized by considering the case where the thyristor 5 is permanently open; the duty cycle ($a/a+b$) assumes 0 value and the magnetization reversing current $I_R$ assumes the value V/R. The case shown in FIG. 3 has a duty cycle of approximately one-third and the magnetization reversing current $I_R$ is always somewhat above the level V/R. With a further increase in the duty cycle the average value of the magnetization reversing current will be greater.

The fact that because of the insertion of the choke inductor 20 an increase in the modulation of the switching element 22 results in a rise of the magnetization reversing current $I_R$, leads to the conclusion that the physical size of the transformer 7 can be reduced. This is so because in designing the dimensions of the transformer 7 the level of the magnetization reversing current $I_R$ at the transition point between time interval $b$ to time interval $a$ is a determining factor. The overall costs for the transformer 7 with a smaller physical size and an additional choke inductor 20 are less than the costs for a transformer of conventional design.

Figure 4:
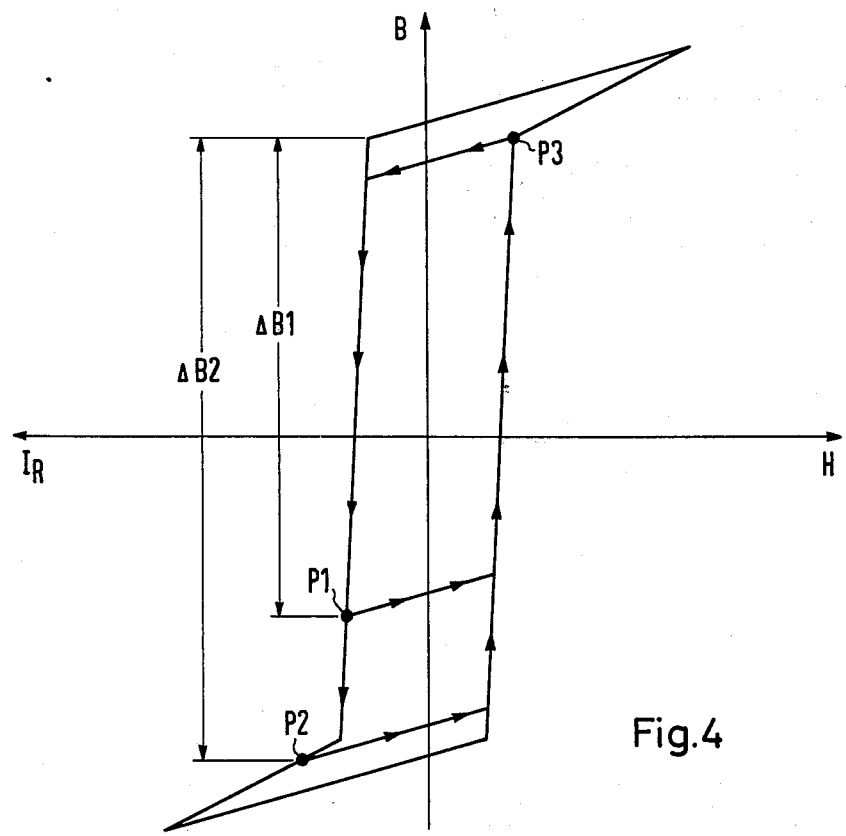
FIG. 4 shows a hysteresis diagram for a transformer in typical operation of a D.C. converter.

FIG. 4 shows a hysteresis loop for the transformer 7. The magnetization B is plotted versus the field intensity H which have negative values proportional to the magnetization reversing current $I_R$. It is apparent from FIG. 4 that with increasing modulation and hence with increasing magnetization reversing current $I_R$, the magnetization excursion B of the transformer 7 is increased. The introduction of a choke inductor 20 causes a shifting of the negative operating point of the transformer 7 from point P1 to point P2. The magnetization excursion B2 with the choke inductor 20 inserted is greater than the magnetization excursion B1 without the choke inductor 20. This increase of magnetization excursion in the transformer yields greater efficiencies and hence the size of the transformer can be reduced.

What is claimed is:

1. Apparatus for converting the D.C. level of a constant voltage source having a negative and positive terminal comprising
   a transformer having a primary coil, a secondary coil, and a magnetization reversing coil
   switching means,
   rectifying means,
   where the primary coil in series with the switching means is connected in parallel across the constant voltage source,
   one side of the secondary coil is connected to the positive terminal of the constant voltage source and the other side is connected to the rectifying means,
   the magnetization reversing coil is connected between the positive terminal of the constant voltage source and a series connected limiting resistor and choke inductor connected to the constant voltage source negative terminal, said magnetization reversing coil connected so that current flowing in it is in a direction opposite to that flowing in the primary coil.

2. The apparatus of claim 1 wherein the inductance value of said choke inductor is sufficient depending on the frequency and modulation of said switching means to prevent the current flowing in said magnetization reversing coil from rising to a value $V_R$ where V is the voltage of said constant voltage source and R is the resistance of said limiting resistor.

* * * * *